E. THOMSON & R. H. RICE.
FLEXIBLE COUPLING.
APPLICATION FILED AUG. 3, 1907.

925,731.

Patented June 22, 1909.
2 SHEETS—SHEET 1.

Witnesses:
Marcus L. Byng.
J. Ellis Glenn

Inventors,
Elihu Thomson,
Richard H. Rice,
By Albert H. Davis
Att'y

E. THOMSON & R. H. RICE.
FLEXIBLE COUPLING.
APPLICATION FILED AUG. 3, 1907.

925,731.

Patented June 22, 1909.
2 SHEETS—SHEET 2.

Witnesses:
Marcus L. Byng.
J. Ellis Glen.

Inventors,
Elihu Thomson,
Richard H. Rice,
By
Atty.

UNITED STATES PATENT OFFICE.

ELIHU THOMSON, OF SWAMPSCOTT, AND RICHARD H. RICE, OF LYNN, MASSACHUSETTS, ASSIGNORS TO GENERAL ELECTRIC COMPANY, A CORPORATION OF NEW YORK.

FLEXIBLE COUPLING.

No. 925,731.  Specification of Letters Patent.  Patented June 22, 1909.

Application filed August 3, 1907. Serial No. 386,979.

*To all whom it may concern:*

Be it known that we, ELIHU THOMSON and RICHARD H. RICE, citizens of the United States, residing at Swampscott, county of Essex, State of Massachusetts, and Lynn, county of Essex, State of Massachusetts, respectively, have invented certain new and useful Improvements in Flexible Couplings, of which the following is a specification.

This invention relates to shaft couplings, and its object is to enable two adjacent shafts whose axes are liable to get out of alinement to be so coupled as not to interfere with the proper running of each shaft and yet effect a rigid connection between them so far as the transmission of torque is concerned. In other words, the two shafts may be displaced with respect to each other either in alinement or laterally, or both, but are incapable of angular displacement.

The invention consists in a species of universal joint comprising two disks of elastic sheet metal, such as steel, whose centers are secured respectively to the ends of the two shafts, while their outer edges are connected together, preferably by means of an interposed collar or collars. The disks are preferably laminated to give them the requisite flexibility in lines parallel with the axes of the shafts, while at the same time they possess great rigidity in their own planes so as to resist torsional strains.

Figure 1:
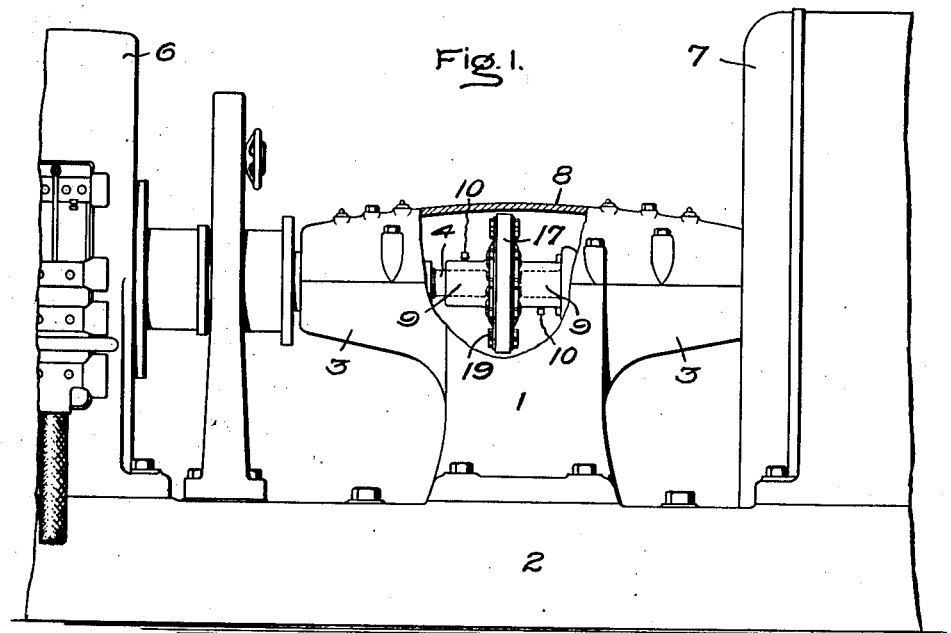
Figure 2:
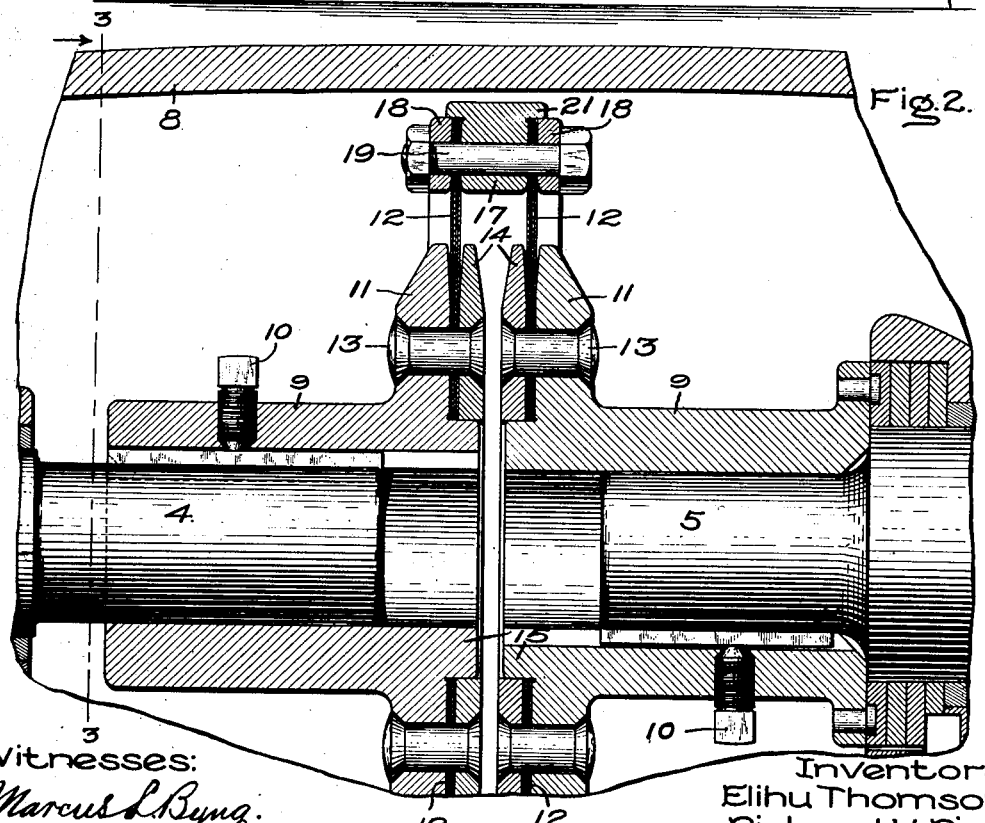
Figure 3:
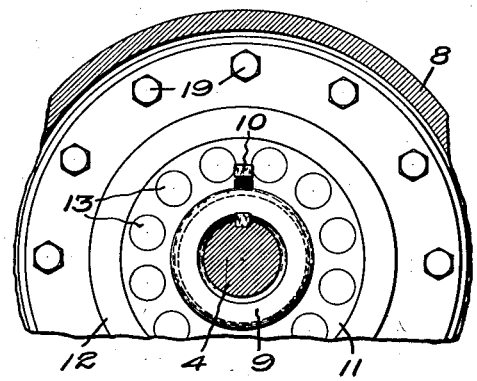
Figure 4:
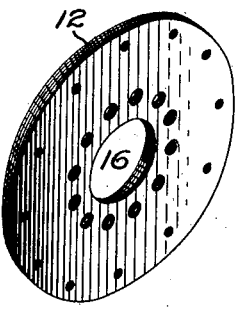
Figure 5:
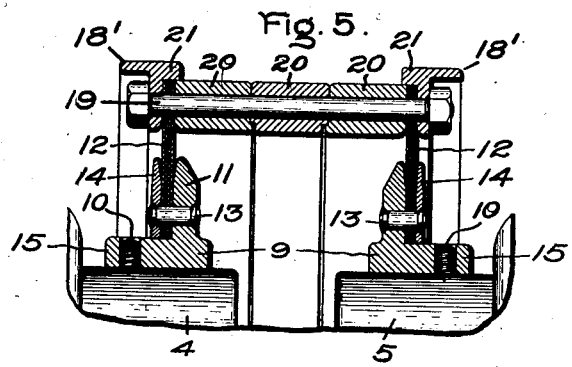

In the accompanying drawing, Figure 1 is a side elevation, partly broken away, of a pillow block having two shaft bearings with a space between them for an improved coupling; Fig. 2 is a sectional elevation of the coupling on a larger scale; Fig. 3 is an end view thereof taken on the line 3—3, Fig. 2, but on a smaller scale than Fig. 2; Fig. 4 is a perspective view of one of the disks, and Fig. 5 is a longitudinal section of a coupling embodying a modified construction.

The pillow block 1 is mounted on a suitable support, such as a bed-plate 2, and is provided with two journal bearings 3 for the ends of two shafts 4 5 belonging respectively to two machines 6 7 which are to be coupled together; such, for example, as a dynamo electric generator and a steam turbine. Sufficient space is left between the two bearings to receive the coupling, which is preferably protected by a cover 8, cast integral with the caps of the bearings, if desired.

A sleeve 9 is splined on each shaft, and after being properly adjusted longitudinally along the shaft it is locked in position by a set screw 10. The sleeve has a circumferential flange 11 which is faced off to receive the central portion of the flexible disk 12, formed preferably of a suitable number of thin laminations of sheet metal, preferably steel. The disk is fastened to the flange by rivets 13, which pass also through a flat ring 14 laid against the surface of the disk, and preferably centered by a short hub 15 projecting from the sleeve through a central opening 16 in the disk. The opposing faces of the flange and ring in contact with the disk are eased off at their outer edges forming slightly curved surfaces which permit the disk to flex without making a sharp bend.

The outer edge portions of the two disks are connected together. In Figs. 1 and 2 they are secured to an interposed collar 17, by means of annular washers 18 and through bolts 19. The thickness of the collar is such that the adjacent ends of the sleeves 9 are separated by a small space sufficient to permit the relative displacement of the two shafts without danger of the two sleeves striking. These laminated disks are capable of flexing freely in lines lengthwise of the shafts, but are absolutely rigid in planes of revolution so that there can be no angular displacement of the shafts, but all torsional strains are transmitted as perfectly as though the flanges on the sleeves were bolted together directly.

The modification shown in Fig. 5 is designed to give greater freedom of movement. Instead of one collar 17, three collars 20 are used, arranged side by side. The middle one is preferably rabbeted to those on each side of it to facilitate assembling.

The peripheries of the disks may be protected by an overlapping flange 21, formed either on the collar 17, as in Fig. 2, or on the washer 18', as in Fig. 5.

In accordance with the provisions of the patent statutes, we have described the principle of operation of our invention, together with the apparatus which we now consider to represent the best embodiment thereof; but we desire to have it understood that the apparatus shown is only illustrative, and that the invention can be carried out by other means.

What we claim as new and desire to secure by Letters Patent of the United States, is,—

1. The combination with two shafts having their ends adjacent each other, of a sleeve secured to the end of each shaft and provided with a flange and a hub, a ring mounted on each hub which is parallel to the adjacent flange, annular laminated metal disks, each disk having its inner portion secured between a flange and ring on one of the sleeves with its outer portion projecting beyond the peripheries of the flange and ring, one or more collars interposed between the outer portions of the disks, and means securing the disks to the collars.

2. The combination with two shafts having their ends adjacent each other, of means for coupling said ends comprising sleeves secured to the end of each shaft having their opposed faces separated by a suitable distance, parallel flange members on the adjacent ends of the sleeves provided with an annular recess whose walls flare outwardly adjacent the periphery of said members, a laminated metal disk in each recess whose diameter is greater than that of the flange members, means for securing the disks in the recesses which are located between the flaring portion and the inner edge of said recesses, one or more collars interposed between the outer portions of the disks, and means for securing the disks to the collars.

3. The combination with two shafts having their ends adjacent each other, of a sleeve secured to the end of each shaft and provided with a flange and a hub, an annular ring of the same outside diameter as the flange mounted on each hub adjacent said flange and in parallel relation thereto, the outer portion of the opposing faces of the ring and flange being curved outwardly, an annular laminated metal disk having its inner portion secured between each flange and its adjacent ring intermediate said curved portion of their faces and said hub, the outer portion of the disk being of greater diameter than said flange and ring, one or more collars interposed between the outer portions of the disks, annular washers on the sides of the disks opposite the collars, and bolts passing through the washers, disks and collars which secure them together.

4. The combination with two shafts, of a sleeve secured to each and provided with a flange, a ring adapted to be secured to each flange, said ring and flange having slightly curved opposing faces, a laminated sheet metal disk secured between each of said flanges and its coöperating ring and one or more collars interposed between the outer edges of said disks.

In witness whereof, we have hereunto set our hands this first day of August, 1907.

ELIHU THOMSON.
RICHARD H. RICE.

Witnesses:
JOHN A. McMANUS, Jr.,
HENRY O. WESTENDARP.